US008484515B2

(12) United States Patent
Adams

(10) Patent No.: US 8,484,515 B2
(45) Date of Patent: Jul. 9, 2013

(54) METHODS AND SYSTEMS FOR MONITORING QUALITY OF A VIDEO/AUDIO PLAYBACK DEVICE

(75) Inventor: Glen A. Adams, Belmont, CA (US)

(73) Assignee: Sigma Designs, Inc., Milpitas, CA (US)

(*) Notice: Subject to any disclaimer, the term of this patent is extended or adjusted under 35 U.S.C. 154(b) by 249 days.

(21) Appl. No.: 12/901,353

(22) Filed: Oct. 8, 2010

(65) Prior Publication Data

US 2011/0107152 A1 May 5, 2011

Related U.S. Application Data

(60) Provisional application No. 61/256,957, filed on Oct. 31, 2009.

(51) Int. Cl.
*G06F 11/00* (2006.01)

(52) U.S. Cl.
USPC .............. 714/43; 714/57; 725/110; 725/151; 725/131

(58) Field of Classification Search
None
See application file for complete search history.

(56) References Cited

U.S. PATENT DOCUMENTS

| 6,434,568 | B1 * | 8/2002 | Bowman-Amuah | 1/1 |
| 6,804,631 | B2 * | 10/2004 | Kelley et al. | 702/187 |
| 7,471,771 | B2 * | 12/2008 | Wahl et al. | 379/1.01 |
| 7,738,633 | B2 * | 6/2010 | Wahl et al. | 379/1.01 |
| 7,920,480 | B2 * | 4/2011 | Jiang et al. | 370/242 |
| 8,209,732 | B2 * | 6/2012 | Le et al. | 725/107 |
| 2010/0202594 | A1 * | 8/2010 | Wahl et al. | 379/1.03 |

* cited by examiner

*Primary Examiner* — Christopher McCarthy
(74) *Attorney, Agent, or Firm* — Convergent Law Group LLP

(57) ABSTRACT

A computer-implemented method, executable software product, and system for performing a test of an audio/video playback device are described. The audio/video playback device includes at least one main processor, interfaces, and additional processors. The main processor(s) communicate with the additional processors through the interfaces. The method, software product, and system include monitoring at least part of the interfaces for communications between the main processor(s) and the additional processors. The method, system and software product also include storing the communications in a raw format during the test. The method, software product and system also include translating the communications from the raw format to human-readable format after the test concludes and displaying the human-readable format of the communications. In some aspects, the method and system also include reading and storing run time data during the test such that the reading and storing is Heisenberg-friendly.

26 Claims, 5 Drawing Sheets

METHODS AND SYSTEMS FOR MONITORING QUALITY OF A VIDEO/AUDIO PLAYBACK DEVICE

CROSS-REFERENCE TO RELATED APPLICATIONS

The present application claims priority from provisional application Ser. No. 61/256,957, filed Oct. 31, 2009, entitled "Methods and Systems for Monitoring Quality of a Video/Audio Playback Device", assigned to the assignee of the present application.

BACKGROUND

FIG. 1 depicts a conventional video and/or audio (audio/video) playback device 10, such as a set top box. A set top box may receive audio/video from a remote location, from a closer location for example within the house of the user, and/or from storage within the set top box. For example, a set top box may receive files from remote locations such as a satellite, from a network, or from a cable service provider. A set top box might receive files from another storage device such as a computer in proximity to the set top box. The set top box may also play files from media such as a Blu-ray disk, or from internal storage. Thus, examples of a playback device may include devices such as a TiVo® box, high definition cable box, or Blu-ray player. The playback device 10 includes a main processor 12, additional processors 14, and is connected to a display 20. The additional processors 14 may include an audio-video signal demultiplexer, an audio decoder, a video decoder and/or other processors. The main processor 12 controls operation of the conventional playback device 10. The additional processors 14 are used to perform functions such as processing a video file. The IR/other inputs allow the playback device 10 to receive input, such as video files from other sources. The conventional playback device 10 outputs video to the display/speakers 20.

In order to play a video file or perform other operations, the main processor 12 calls the additional processors to perform specific operations. For example, in response to a request from a user to play a video file, the main processor 12 may communicate with the additional processors 14 to determine the amount of memory the audio and video decoders require, set aside a particular amount of memory, set the particular type of encoding used for the video being played, set various other properties for the audio and/or video decoders, and otherwise communicate with the additional processors. During playback of the video file, the user may request other operations such as turning on closed captioning, changing the volume or channel, and/or performing trick operations such as a pause, rewind, or fast forward. To perform these operations, the main processor 12 communicates with the additional processors 14. In addition, data from the video file, which is typically sent from the main processor 12, may continue to be received and provided to the additional processors 14 for processing and display using display/speakers 20. Thus, the main processor 12 continues to call and/or receive returns from the additional processors 14 throughout playback. Thus, through the operation of the main processor 12 and additional processors 14, operation of the conventional playback device 10 may continue.

Manufacturers of and/or purchasers of components for playback devices often desire to test the quality of their systems before providing them to end users. For example, they may desire to test whether software applications they have written work with a set top box and whether a video file from a network can be acceptably played on the set top box. In order to do so, the conventional playback device 10 is operated. Typically, testers play video files on the conventional playback device 10 and look for glitches appearing on the display 20 or heard on the speakers 20. The tester may utilize debug logs generated by the software application being tested. In addition, high level commands such as a user inputting a play command or other trick operation may be logged. Based on the results of such tests, the performance of the conventional playback device 10 may be evaluated.

Although conventional methods for testing the conventional playback device 10 exist, there are drawbacks. Most particularly, many conventional methods for testing the conventional playback device 10 perturb the performance of the conventional playback device 10. As a result, such methods may be unable to accurately assess performance of the conventional playback device 10. Use of debugging logs, for example, may result in a large number of debugging messages sent by the maker of the application. Storage of the debugging messages in human readable format, such as text strings, may consume a significant amount of memory and CPU resources. Such storage may also distort the video being played. Viewing played video files on the display and checking for glitches may indicate whether a particular file can be played. However, not all glitches are detectable by the human eyes and/or ears. In addition, viewing/hearing the glitches on the display 20 or speakers 20 may not indicate what is causing the glitches or how the issue might be solved. Similarly, logging of high level commands may not provide a fine enough view of operation of the playback device to adequately diagnose issues with performance. Thus, an improved method for evaluating the performance of a playback device is desired.

BRIEF SUMMARY

A computer-implemented method, executable software product, and system for performing a test of an audio/video playback device are described. The audio/video playback device includes at least one main processor, interfaces, and additional processors. The main processor(s) communicate with the additional processors through the interfaces. The method, software product, and system include monitoring at least a portion of the interfaces for communications between the main processor(s) and the additional processors. The method, system and software product also include storing the communications in a raw format during the test. The method, software product and system also include translating the communications from the raw format to human-readable format after conclusion of the test and displaying the human-readable format of the communications. In some aspects, the method and system also include reading and storing run time data during the test such that the reading and storing is Heisenberg-friendly.

According to the method and system disclosed herein, the exemplary embodiment may allow for testing and evaluation of audio/video playback in a Heisenberg-friendly manner. Thus, monitoring and testing of the audio/video playback device may be accomplished substantially without perturbing performance of the device. As a result, a more accurate evaluation of performance of the audio/video playback device may be achieved.

DETAILED DESCRIPTION

The exemplary embodiments relate to testing of playback devices. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The exemplary embodiments provide a computer-implemented method, executable software product, and system for performing a test of an audio/video playback device. The playback device includes at least one main processor, interfaces, and additional processors. The main processor(s) communicate with the additional processors through the interfaces. The method, software product, and system include monitoring at least a portion of the interfaces for communications between the main processor(s) and the additional processors. The method, system and software product also include storing the communications in a raw format during the test. The method, software product and system also include translating the communications from the raw format to human-readable format after conclusion of the test and displaying the human-readable format of the communications. Thus, the testing may be accomplished in a Heisenberg-friendly manner. In some aspects, the method and system also include reading registers during the test such that the reading is Heisenberg-friendly. In such an aspect, the storing further includes recording the values of the registers.

Figure 1:
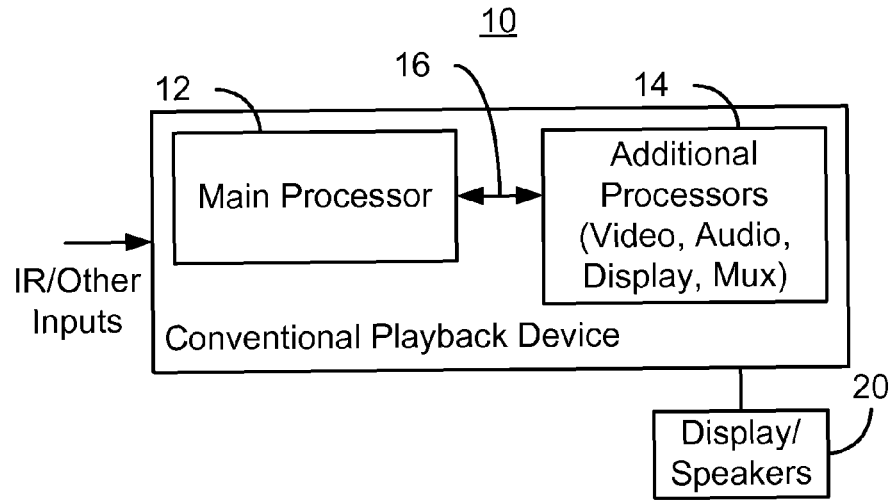
FIG. 1 depicts a conventional playback device.
Figure 2:
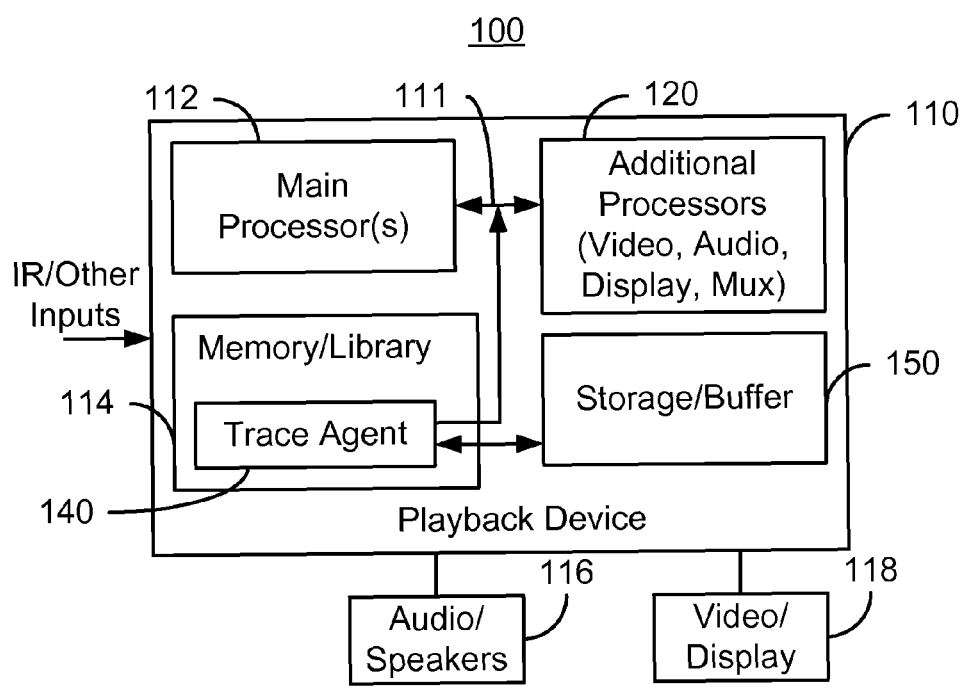
FIG. 2 depicts an exemplary embodiment of a system for performing testing of a video and/or audio playback device.

FIG. 2 depicts an exemplary embodiment of a system 100 for performing testing of a video and/or audio playback device. The system 100 is depicted in connection with and, in some embodiments, integrated into the playback device 110. The playback device 110 may be a set top box or other device configured to play video and/or audio, such as a video file provided via the IR/other inputs. Thus, in some embodiments, the portions of the playback device 110 may be part of a system on a chip used in a set top box. The playback device 110 includes main processor(s) 112, memory 114 that may include a library, and additional processors 120. The playback device 110 may use audio/speakers 116 and video/display 118 for playing the audio and/or video. The main processor(s) 112 may include one or more central processing unit(s). For simplicity, the system 100 is described in the context of a single main processor 112. The additional processors 120 may include an audio-video signal demultiplexer, an audio decoder, a video decoder and/or other processors. The main processor 112 controls operation of the playback device 110. The additional processors 120 are used to perform functions such as processing a video file or other data stream that might arrive from a network or other source via IR/other inputs and providing the output to the audio/speakers 116 and video/display 118.

In operation, the playback device 110 functions in an analogous manner to the conventional playback device 10. For example, to play a video file or perform other operations, the main processor 112 calls the additional processors 120 to set properties and perform specific operations. In response to a request from a user to play a video file, the main processor 112 may communicate with the additional processors 120 to determine the amount of memory the audio and video decoders require, set aside a particular amount of memory, set the particular type of encoding used for the video being played, set various other properties for the audio and/or video decoders, and otherwise communicate with the additional processors. During playback of the video file, the main processor 112 continues to communicate with the additional processors 120. Thus, the main processor 112 continues to call, set properties, and/or receive returns from the additional processors 120 throughout playback.

The system 100 further includes trace agent 140 and storage 150 used in performing a test of the playback device 110. In the embodiment shown, the trace agent 140 and storage 150 are part of the playback device 110. However, in another embodiment, the storage 150 may be coded in another location and the trace agent 140 may be compiled and stored elsewhere, such as a host machine (not shown). The test performed using the trace agent 140 and storage 150 may be of short or long duration, and may involve a few or a large number of operations by the additional processors 120. The test being performed typically involves playback of a video file, but could include control of the television to change channels, provide closed captioning, and/or perform other operations. The storage 150 may be a buffer. In some embodiments, the storage 150 is a circular buffer. In some such embodiments, the storage 150 is approximately 64 KB. In other embodiments the storage 150 is one hundred twenty eight KB. In other embodiments, the size of the storage 150 may differ.

The trace agent 140 may be stored in the memory 114 and executed by the main processor 112. The trace agent 140 monitors the interfaces 111 during the test. More specifically, the trace agent monitors at least a portion of the interfaces 111 between the main processor 112 and the additional processors 120 for communications between the main processor 112 and the additional processors 120. The trace agent 140 thus monitors the setting of properties, commands, return values, and any other communication between the main processor 112 and the additional processors 120 occurring over the interface 111. All of such communications are thus monitored by the trace agent 140. During the test, the trace agent 140 also stores these communications in the storage 150 in a raw format. For example, the trace agent 140 may record the communications in the storage 150 in machine language. In some embodiments, the trace agent 140 also filters the communications such that some of the communications are not recorded in the storage 150. For example, the trace agent 140 may determine whether a particular property or command has occurred on the interface(s) 111 a threshold number of times during the test. This threshold may be one value during initialization/ shut down and another value during steady state operation of the playback device 110. In other embodiments, filtering may only be performed during steady state operation portion of the test. In yet other embodiments, filtering may only be performed during initialization or shut down. Filtering may also be omitted. Thus all of the communications over the interfaces 111 are still monitored, but because of filtering less than all of the communications may be reported. For example, those communications for which the appropriate threshold is reached may no longer be reported. In other embodiments, only a fraction of the number of times communications occur are recorded after the threshold is reached. The trace agent 140 also translates the communications from the raw format to human-readable format after conclusion of the test. For example, the identities of properties called, their arguments, and the results returned may be translated into text. These translations may be performed using a lookup table that converts the machine code/raw format of properties, arguments, and other communications to text. Further, the order of the communications may be provided by placing the translated communications in order in the human-readable format. In some embodiments, the human-readable format may include a graphical representation of the communications. In other embodiments, the human-readable format may include text. In still other embodiments, graphics and text may be combined.

The human-readable format may then be displayed to the user, for example on the display 118 or on a host (not shown). For example, a file listing the text corresponding to the communications may be accessed by the user and printed or shown on a display. The display might be the display 118 corresponding to the playback device or a separate display of another computer. In some embodiments, graphs of the communications may be provided. For example, the number of occurrences of particular properties or other communications versus time may be depicted. As a result, the communications may be provided to the user in a manner that the user can read.

In some embodiments, the trace agent 140 also collects performance statistics data on the playback device 110. For example, in addition to monitoring the interfaces 111, the trace agent 140 may query registers for the additional processors 120. These registers may indicate the status of buffers, the status of a clock, or other locations storing relevant run time information. The trace agent 140 reads the registers during the test such that the reading is Heisenberg-friendly. Thus, the run time performance data is read frequently enough to provide useful information, but infrequently enough such that performance is not adversely impacted. The trace agent 140 also records the values of the registers or other run time data in the storage 150. In one embodiment, this data is recorded in a raw format rather than translated into human-readable format. Thus, both monitoring and recording of the performance data is accomplished in a Heisenberg-friendly manner. Further, the data may be analyzed and statistics calculated during or after the test is complete. To this extent, this function of the trace agent 140 is analogous to monitoring of the interfaces. Thus, the collection and storage of the performance statistics data may be accomplished in a Heisenberg-friendly manner.

Thus, the trace agent 140 collects data relating to the communications on the interfaces 111 and may collect data from the additional processors 120 relating to run time performance. At the end of the test, the information in the raw format recorded in the storage 150 is translated to human-readable format. The computation intensive translation of data from raw format to human readable format is, therefore, moved to a time when the test has concluded. Because the communications and run time performance data are stored in a raw format, rather than being translated into a human-readable format, the collection of data relating to the communications and storage of the communications is done in a Heisenberg-friendly manner. The operation of the trace agent 140 may not, therefore, substantially perturb operation of the playback device 110. Thus, the performance of the playback device 110 may be monitored and tested without causing glitches or otherwise affecting the quality of playback. Because testing may be accomplished in a Heisenberg-friendly manner, a manufacturer may be better assured that the test results accurately indicate performance of the playback device, rather than the test itself.

The trace agent 140 may optionally be configured to receive a command to provide currently-available data in human-readable format during the test. In response to such a command, the trace agent 140 may translate the currently-available portion of the raw format stored in the storage buffer 150 to human readable format. The currently-available portion of data in the human-readable format may also be provided to the display 118 or other display in response to the command.

Note that if a user requests translation of the currently-available raw format into human-readable format during the test, this portion of the operation of the trace agent 140 may not be Heisenberg-friendly. However, because this operation is performed in response to a user request, the user may be aware that operation of the playback device 110 may be adversely affected by the request and thus ignore glitches in playback or other issues due to the request. Although not Heisenberg-friendly, this feature allows a tester to see data that may be related to a particular glitch or other issue without incurring the possibility that the data related to the glitch is overwritten (for a circular buffer 150) or otherwise discarded. That said, in some embodiments, performing translation in response to a user request (or on the fly for other reasons) may be modified to mitigate the effects on the playback. In particular, the translation may be configured to perform such a translation chunk by chunk to reduce the likelihood of glitches. This may be accomplished by translating and outputting chunks of data at an output rate that is a fraction of the inbound bit rate for the raw data. For example, suppose a video file is four GB and has a 10 Mbit/sec bit rate. In such an embodiment, chunks that are small, for example approximately 3-4 KB, may be translated at a time and provided to the user. In some embodiments, the chunks would be at least three KB to ensure that lines of HTML are not split. Thus, the translation would not exceed the bit rate of the video file. In addition, data such as charts or other graphs related to playback may also be provided to the user in chunks. As a result, the Heisenberg-unfriendly nature of such an operation may be mitigated. Further, because the trace agent 140 generally operates in a Heisenberg-friendly manner, the trace agent 140 may simply be provided as part of, and always running on, the playback device 110. The trace agent 140 may thus be incorporated into the playback device 110 that is provided to end users. However, in general, it is believed that end users will not utilize the trace agent 140 and storage 150.

Further, storage of the performance data and communications in raw format consumes less memory in the storage 150. For example, a generic identity of a call may consume only sixteen bytes of memory in raw format (machine language). In contrast, storing this information as a text string may require sixty-four characters, consuming a significantly larger portion of the storage 150. In some cases, conversion to a text string may involve an increase in the memory required by a factor of four. In the example above, the sixteen bytes of memory may be converted to sixty-four bytes of memory for a text string. Thus, in addition to being Heisenberg-friendly, storage of raw data allows a smaller storage 150 to be used. In some embodiments, for example, the storage 150 may be a circular buffer that is only 64 KB or 128 KB in size.

In addition to being Heisenberg-friendly, the trace agent 140 and its use of the storage 150 may allow for improved evaluation of the performance of the playback device 110. For example, because each communication between the main processor 112 and the additional processors 120 may be recorded, a more accurate picture of issues in the performance of the playback device 110 may be achieved. The arguments used in properties, the order that properties are called, and results returned may be determined in a Heisenberg-friendly manner. It can thus be determined whether software applications desired to run on the playback device 110 call properties in the proper order, provide the correct arguments and function within the specifications of the playback device 110. This determination may be made even where the source code for the software application itself is unavailable or too complex to separately understand. Similarly, because performance data for the additional processors 120 may be read from registers and recorded, other issues with performance may be diagnosed in a Heisenberg-friendly manner. These registers may report skips, starvations, buffer levels, errors in the data stream, and lateness of data packets for audio and/or video. Thus, it can be determined whether frame(s) are skipped, what relevant buffer levels are, whether a buffer is starved, whether there is an error in the data provided to the playback device 110, and when a system clock rolls over. Issues in performance such as a skipped frame or a stoppage of playback in the video may then be correlated to particular activities such as a starved buffer or clock rollover. Thus, reasons behind a decline in performance may be better diagnosed. Consequently, meaningful testing of the playback device 110 as well as software applications run on the playback device 110 may be better achieved.

In another embodiment, operations may be performed offline from the set top box. For example, translation of raw data may be performed on a host computer. In such an embodiment, the host computer can collect raw data from one or many trace agents 140 of many set top boxes. The host may be synced with the raw data from set top box(es). The host performs the translation of the raw data and outputs the translation to the user. The host may thus be used to report on configuration of and commands used in playback. In other embodiments, the properties are analyzed (either in real time or offline) by a host computer for correct and/or consistent arguments, order, and other properties. For example, the host may search for memory leaks, terms which are defined but not used, or other issues. Thus, the host may determine whether operation of the set top box is consistent with the rules provided for the set top box. Consequently, translation, analysis, and/or reporting may be performed by the set top box and/or offline by the host computer. Flexibility of the system may thus be improved.

Figure 3:
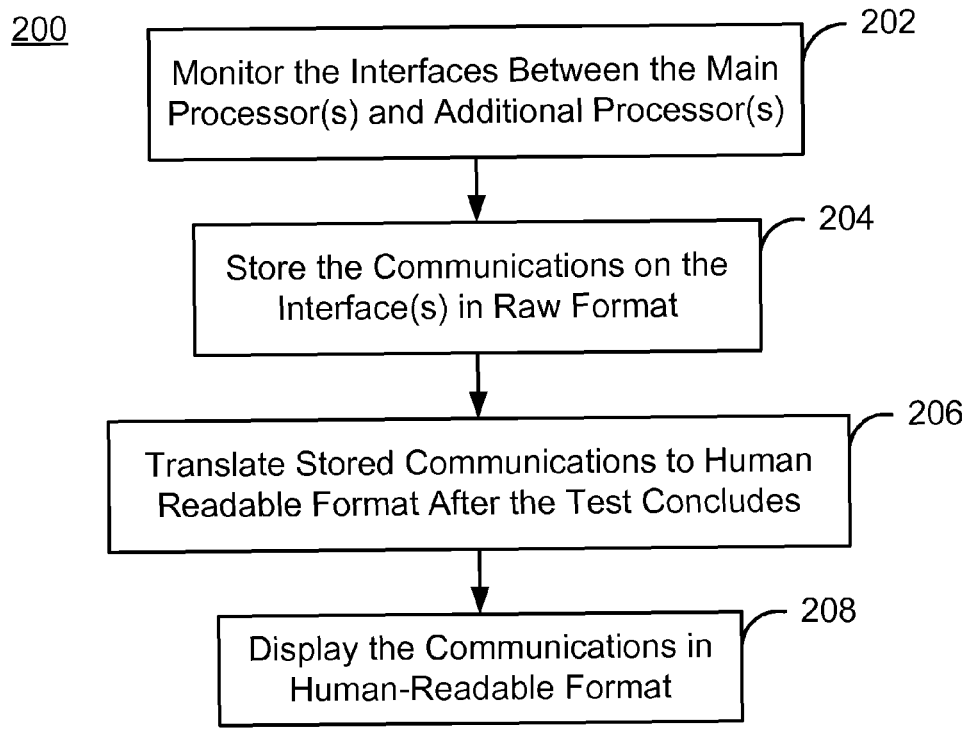
FIG. 3 depicts an exemplary embodiment of the flow for an exemplary embodiment of a method for performing testing of a video and/or audio playback device.

FIG. 3 depicts an exemplary embodiment of the flow for an exemplary embodiment of a method 200 for performing testing of a video and/or audio playback device. For clarity, the method 200 is discussed in the context of the system 100. Further, the method 200 is described in the context of steps performed in a particular order. However, at least some of these steps may be performed in parallel or in another order not inconsistent with the method and system described. Further, the method 200 may also include other and/or different steps that are not inconsistent with the method and system described.

The interfaces 111 between the main processor 112 and the additional processors 120 are monitored, via step 202. In one embodiment, the interfaces 111 are monitored for communications between the main processor 112 and the additional processors 120 using the trace agent 140. In some embodiments, all of the interfaces 111 are monitored. In other embodiments, only a subset of the interfaces may be monitored. In some embodiments, monitoring of the interfaces 111 starts in response to initialization of the interfaces 111. Communications both to and from the main processor 112 may be monitored in step 202. Also in step 202, filtering may be performed. Certain properties may be repeatedly used during operation of the playback device 110. Some of these repeated properties may not have significant meaning or may consume an undesirably large amount of the storage 150. Monitoring of such properties may be filtered. For example, it may be determined whether the property has occurred or been recorded a threshold number of times. If so, the property may be flagged in step 202. The threshold number may change depending upon operation of the playback device. 110. For example, the threshold number may be a first threshold during a dynamic phase (initialization/shut down) of the test and a second threshold during a steady state phase of the test. In another embodiment, filtering may only be performed after steady state phase is attained.

The communications read from the interfaces in step 202 are stored in a raw format during the test, via step 204. In some embodiments, the trace agent 140 stores the communications in the raw format, such as machine language, in the storage 150. For example, the communications may be calls to the additional processors 120 relating to various properties of the playback device 110. In step 204 data related to the properties contained in the communications are recorded. For example, the property identity for each property, argument(s) of the properties, and results for the properties may be stored. In some embodiments, the order in which the properties are called may be inferred from the order in which data for the properties is stored, Further, if the property is flagged in step 202, then the property may not be stored in step 204 or only some portion of future occurrences stored in step 204. In addition, for tests lasting a long time, the number of communications stored in step 204 may be reduced. Tests performed using the method 200 may last a varied amount of time. For example, some tests might last only a few minutes, others a few hours, while others still may last for days. Longer tests are more likely to result in the storage 150 being filled. If the storage 150 is a circular buffer, the storage 150 may be circled, and a portion of data overwritten. The number of communications recorded in step 204 may be reduced. For example, communications may be filtered, as discussed herein, or reduced in another manner. For example, the system 100 may filter the properties stored, compress the data or perform other analogous functions to slow filling of the storage 150. For long term tests (also known as soak tests), certain data may be preserved to ensure that reduction of the data stored does not result in the loss of certain information. For example, a soak test may be performed overnight or over a weekend. Normal data reduction may result in the filtering or loss of charts or other data. However, charts and/or other information related to anomalies in a soak test may be stored. For example, a chart or other data relating to a glitch in audio and/or video may be stored to ensure that this information remains available for display to the user. The user can evaluate quality of the playback using this information. However, other data may be discarded to reduce the total amount of data stored. Reducing the number of communications stored assists in ensuring that the storage 150 is not filled and data are not overwritten. Thus, although data are stored in step 204, steps may be taken to preclude circling the buffer. Also note that the steps 202 and 204 are performed generally in parallel throughout testing of the playback device 110.

The communications are translated from the raw format to human-readable format after conclusion of the test, via step 206. Step 206 may be performed in response to the application being run completing, the end of the video file being reached, or the interfaces 111 being closed. The trace agent 140 may then dump the contents of the storage 150 through step 206. In some embodiments, the trace agent 140 may use a lookup table or other mechanism to translate the machine language or other raw format to a human-readable format such as text and/or graphics. The human-readable format of the communications is displayed to the user, via step 208. If the property was flagged for filtering in step 202, then this may be indicated in the display of step 208. For example, in a graphical display, the color of the property may be changed for the last occurrence reported. In some embodiments, a text message indicating the filtering may be provided.

Using the method 200, the benefits of the trace agent 140 may be achieved. In particular, because communications are stored in a raw format, the method 200 may be Heisenberg-friendly. In addition, as discussed above, the method 200 may allow for improved evaluation of the performance of the playback device 110. For example, because each communication between the main processor 112 and the additional processors 120 may be monitored and recorded in steps 202 and 204, a more accurate picture of issues in the performance of the playback device 110 may be achieved. The properties' identities, the arguments used in properties, results returned, and the order that properties are called may be determined in a Heisenberg-friendly manner. Further, automated real-time or offline analysis of the properties may also be performed. It can thus be determined whether software applications desired to run on the playback device 110 call properties in the proper order, provide the correct arguments and function within the specifications of the playback device 110. Consequently, meaningful testing of the playback device 110 as well as software applications run on the playback device 110 may be better achieved.

Figure 4:
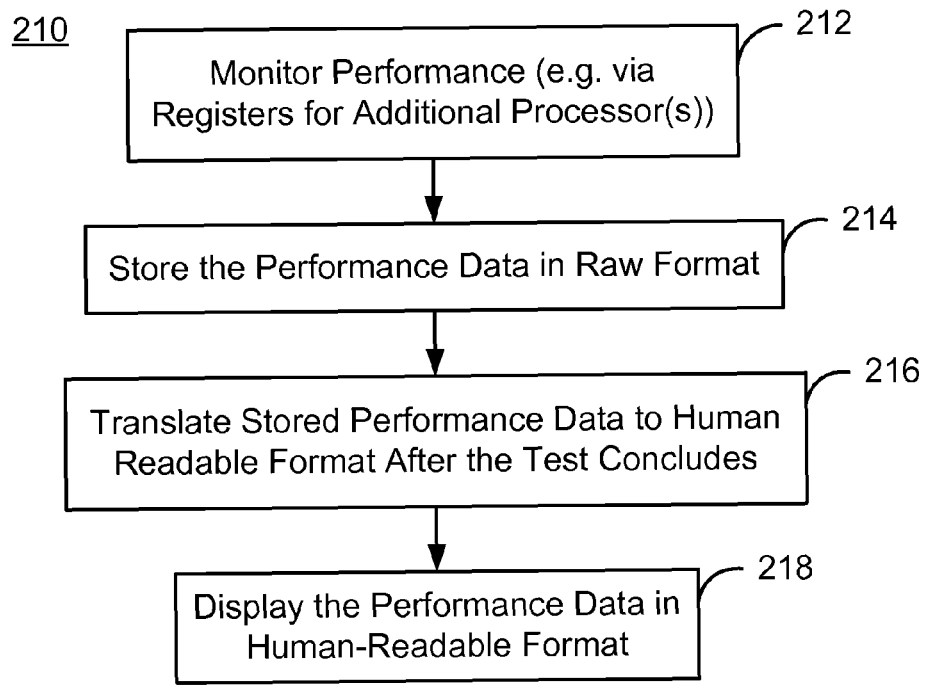
FIG. 4 depicts an exemplary embodiment of a method for performing testing of a video and/or audio playback device.

FIG. 4 depicts another exemplary embodiment of a method 210 for performing testing of a video and/or audio playback device. For clarity, the method 210 is discussed in the context of the system 100. Further, the method 210 is described in the context of steps performed in a particular order. However, at least some of these steps may be performed in parallel or in another order not inconsistent with the method and system described. Further, the method 210 may also include other and/or different steps that are not inconsistent with the method and system described.

Performance data for the playback device 110 is monitored, via step 212. Step 212 may be commenced when data is sent to additional processors 120, such as audio and/or video decoders. In one embodiment, step 212 is performed using the trace agent. In some embodiments, the trace agent 140 may query registers for the additional processors 120 in step 212. These registers may indicate the status of buffers, the status of a clock, or other locations storing relevant run time information. Step 212 is performed in a Heisenberg-friendly manner. Thus, the run time performance data is read frequently enough in step 212 to provide useful information, but infrequently enough such that performance is not adversely impacted. In some embodiments, step 212 includes reading registers corresponding to the additional processors 120. In some embodiments, registers or other repositories of run time data may be considered part of the additional processors 120. In other embodiments, the performance data may relate to other components of the playback device 110, such as the main processor(s) 112. For example, registers such as a register (not shown in FIG. 2) on the main processor(s) that indicate whether the network has dropped packet(s) may be read in step 212. In addition, main CPU 112 usage/percentage, memory bandwidth, operating system statistics or other properties of the main processor(s) 112 may be read. The monitoring of the main processor(s) 112 plus the auxiliary processors 120 may provide a more complete picture of the performance of the system 100. The performance data is stored in raw format, via step 214.

The performance data is stored in raw format, via step 214. In some embodiments, the trace agent 140 also records the performance data, such as values of the registers or other run time data, in the storage 150 in step 214. Thus, storage of the performance data in step 214 may be accomplished in a Heisenberg-friendly manner. As discussed above with respect to step 204, the total amount of data stored may be reduced. However, some data, such as that relating to glitches in a soak test, may not be discarded to preserve information of interest to evaluating performance of the playback. Steps 212 and 214 may be performed substantially in parallel throughout testing of the playback device 110.

The performance data are translated from the raw format to human-readable format after the conclusion of the test, via step 216. In some embodiments, step 216 is performed using the trace agent 140. For example, the trace agent 140 may use a lookup table or other mechanism to translate the statistics or other raw format to a human-readable format such as text and/or graphics. The human-readable format of the performance data is displayed to the user, via step 218.

Using the method 210, performance data may be monitored and recorded in a Heisenberg-friendly manner. As a result, the method 210 may allow for improved evaluation of the performance of the playback device 110. For example, statistics on the run time performance of the playback device may be obtained. More specifically, occurrences such as skips, starvations, buffer levels, errors in the data stream, lateness of audio and/or video data may be reported. Issues with performance may be correlated to particular occurrences monitored, such as starvation of a buffer, a buffer being filled, or clock rollover. In addition, it may be possible to tell whether a particular glitch is due to external issues such as the network not providing data to the playback device 110, and encoding errors, or issues internal to the playback device 110. Consequently, meaningful testing of the playback device 110 as well as software applications run on the playback device 110 may be better achieved.

Figure 5:
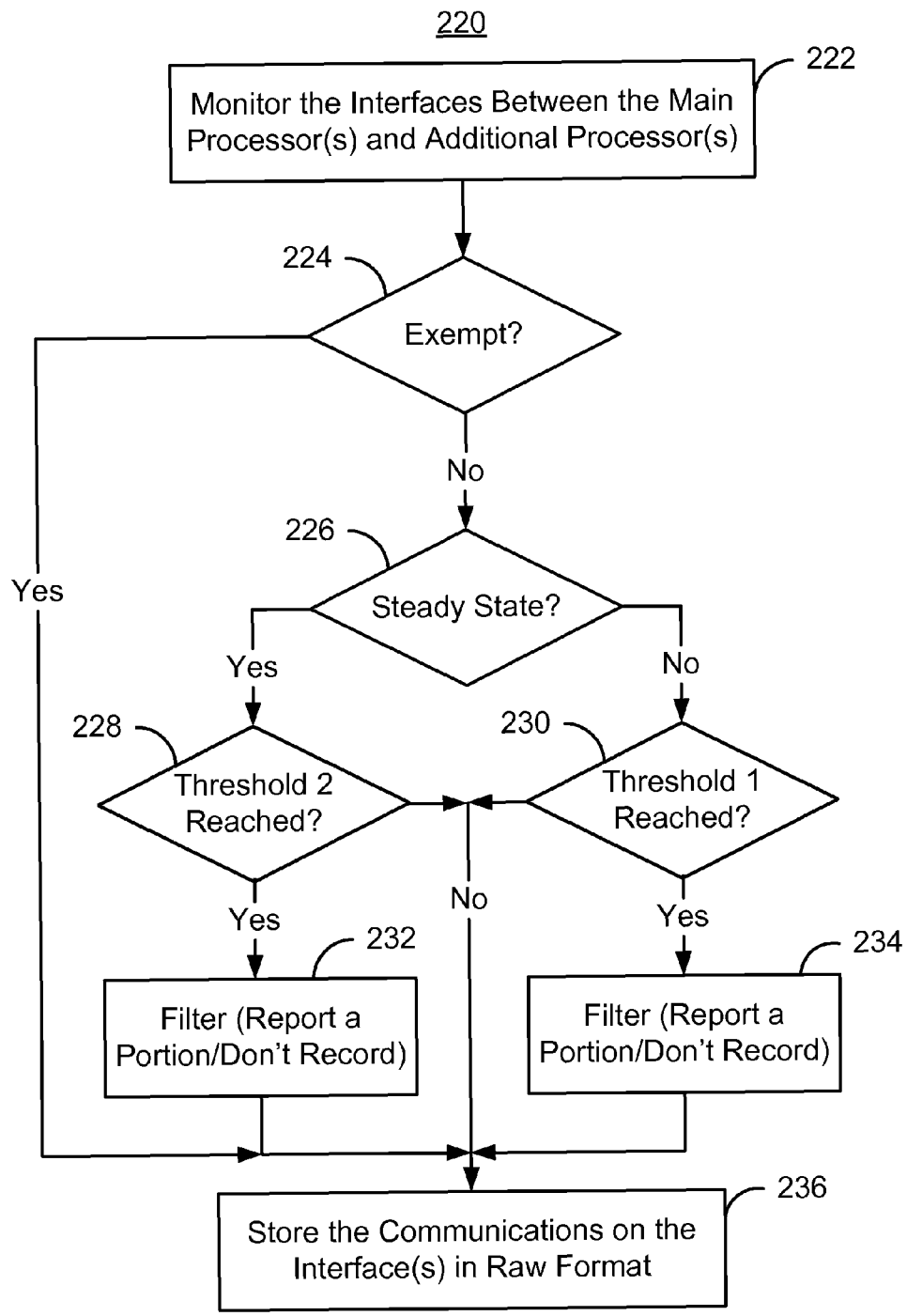
FIG. 5 depicts another exemplary embodiment of a method for performing testing of a video and/or audio playback device.

FIG. 5 depicts another exemplary embodiment of a method 220 for performing testing of a video and/or audio playback device. More specifically, the method 220 may be used in filtering optionally performed during the method 200, described above. For clarity, the method 220 is discussed in the context of the system 100. Further, the method 220 is described in the context of steps performed in a particular order. However, at least some of these steps may be performed in parallel or in another order not inconsistent with the method and system described. Further, the method 220 may also include other and/or different steps that are not inconsistent with the method and system described.

The interfaces 111 between the main processor 112 and additional processors 120 are monitored, via step 222. Step 222 may be considered to be analogous to step 202 of the method 200. In addition, step 222 may be considered to be carried out throughout testing of the playback device 110. It is determined whether a particular communication, such as setting of a property, is exempt from filtering, via step 224. Step 224 may be performed by consulting a table. For example, a particular table may list either those properties that are exempt from filtering. In another embodiment, the table may include those properties that are not exempt from filtering. Properties that may not be desired to be filtered may be determined on a case-by-case basis. Alternatively, such properties may be predetermined. For example, in one embodiment, commands such as stop, playback, pause, or entry into a trick mode such as fast forward may be exempt. Similarly opening/closing of audio and video decoders generally happens very infrequently and may also be an exception to filtering. Such commands may be exempt because they may occur with relatively low frequency and are generally important to the playback device 110 performing as desired.

If the communication is exempt from filtering, then the method 220 skips to storage of the communications in step 236, discussed below. Otherwise, it is determined whether the playback device 110 has reached steady state operation, via step 226. In some embodiments, the playback device 110 may be considered to be in an initialization phase when playback of a video file is commencing. Thus, the main processor 112 would be allocating memory, querying the additional processors 120, and performing other initial operations. Initialization is a dynamic phase. A steady state phase may be entered as a video file is actually played. Thus, the same operations related to fetching a portion of the audio and video data from a buffer, decoding the data, and playing the data, are repeatedly performed. A dynamic phase is reentered upon shut down. If the playback device is not yet in a steady state phase, then it is determined whether a first threshold for the particular communication has been reached, via step 230. A threshold is a particular number of times that the communication has been reached. In some embodiments, this first threshold is higher than a second threshold, described below. In one embodiment, for example, the first threshold may be ten or more, while the second threshold is three. If the first threshold is not reached, then the method skips to step 236. If the threshold has been reached, then reporting of the communication is filtered, via step 234. For example, it may be determined that data relating to the communication is discarded. Thus, the communication will not be recorded in the storage 150. In other embodiments, some portion of the occurrences, such as every $n^{th}$ occurrence (n is an integer) of the communication, are to be recorded. In other embodiments, only the last occurrence of the communication might be retained. The method 220 then moves to step 236, described below.

If it is determined that steady state has been reached, then it is determined whether a second threshold for the particular communication has been reached, via step 228. If not, then the method skips to step 236. If the second threshold has been reached, then reporting of the communication is filtered, via step 232. For example, it may be determined that data relating to the communication is discarded. Thus, the communication will not be recorded in the storage 150. In other embodiments, some portion of the occurrences, such as every $j^{th}$ occurrence (j is an integer) of the communication, are to be recorded. In still other embodiments, on the last occurrence of the communication is retained. The method 220 then moves to step 236, described below.

Once filtering is determined, the communication is appropriately stored, via step 236. If it was determined in step 224 that the communication is exempt from filtering, then the communication is always stored in raw format in the storage 150, via step 236. If the communication is filtered, then how the data are stored may be determined in step 232 or step 234. Thus, step 236 may not store any data related to the communication or may store some occurrences of the communication. However, any data stored in step 236 is recorded in raw format.

Thus, using the method 220, filtered monitoring and storage of the communications over the interfaces 111 may be performed. As a result, memory in the storage 150 may be conserved. Data may be less likely to be overwritten or discarded in an unplanned manner. For example, if the storage 150 is a circular buffer, filtering may make it less likely that the buffer is circled. Similarly, filtering in a planned fashion may make it less likely that all future performance data will be discarded. In addition, even where the storage 150 is not limited, filtering may prevent storage of an extremely large amount of data for the test being performed. Consequently, testing using the method 200 and 220 and the system 100 may be improved.

Figure 6:
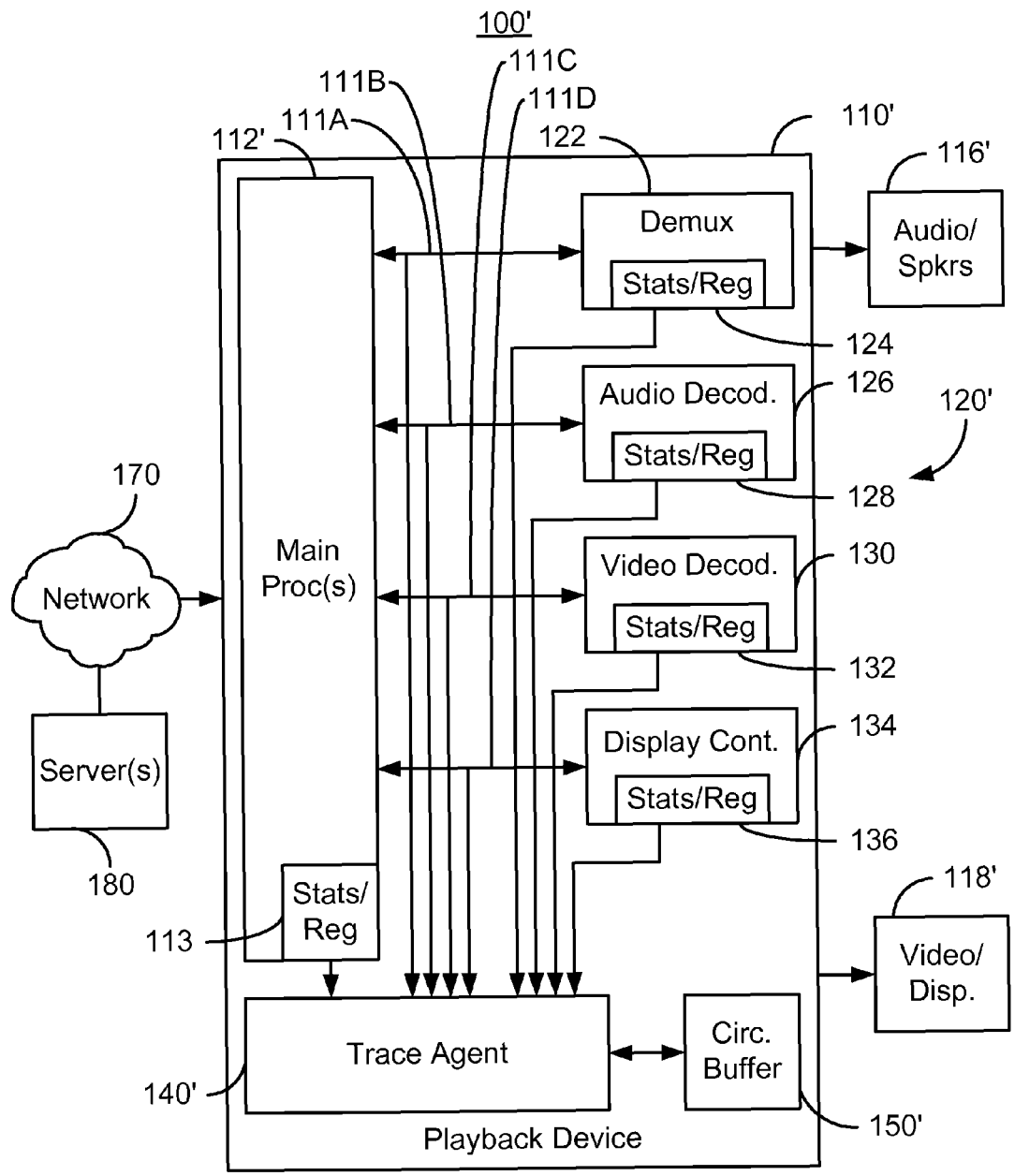
FIG. 6 depicts another exemplary embodiment of a system for performing testing of a video and/or audio playback device.

FIG. 6 depicts another exemplary embodiment of a system 100' for performing testing of a video and/or audio playback device. The system 100' is depicted in connection with and, in some embodiments, integrated into the playback device 110'. The system 100' and playback device 110' are analogous to the system 100 and playback device 110, respectively. Thus, similar components perform analogous functions. The playback device 110' thus includes audio/speakers 116', video/display 118', storage 150', main processor(s) 112', additional processors 120' which are separately shown as demultiplexer 122, audio decoder 126, video decoder 130, and display controller 134, and interfaces 111A, 111B, 111C, and 111D. For simplicity, the memory 114 is not separately shown. In the embodiment shown in FIG. 6, the storage 150' is at least one circular buffer. For simplicity a single main processor 112' is considered to be used. Also shown are network 170 and server 180 to which the playback device 110' may be connected. Thus, the playback device 110' may receive video and/or audio files stored by the server 180 via the network 170.

The main processor 112' controls operation of the playback device 110', including setting of properties of and calls to the additional processors 122, 126, 130, and 134. The demultiplexer 122 may separate audio and video data from a video file received by the playback device 110'. The audio decoder 126 decodes the audio data, while the video decoder 130 decodes the video data. The display controller 134 controls display/playing of the decoded audio and video data on the speakers 116' and display 118'. The main processor 112' and additional processors 122, 126, 130, and 134 each include registers or other performance data storage 113, 124, 128, 132, and 136, respectively.

The system 100' further includes trace agent 140' and storage 150' used in performing a test of the playback device 110'. The test may be of short or long duration, and may involve a few or a large number of operations by the additional processors 122, 126, 130, and 134. The operation of the trace agent 140' and circular buffer 150' are analogous to that described above.

Figure 7:
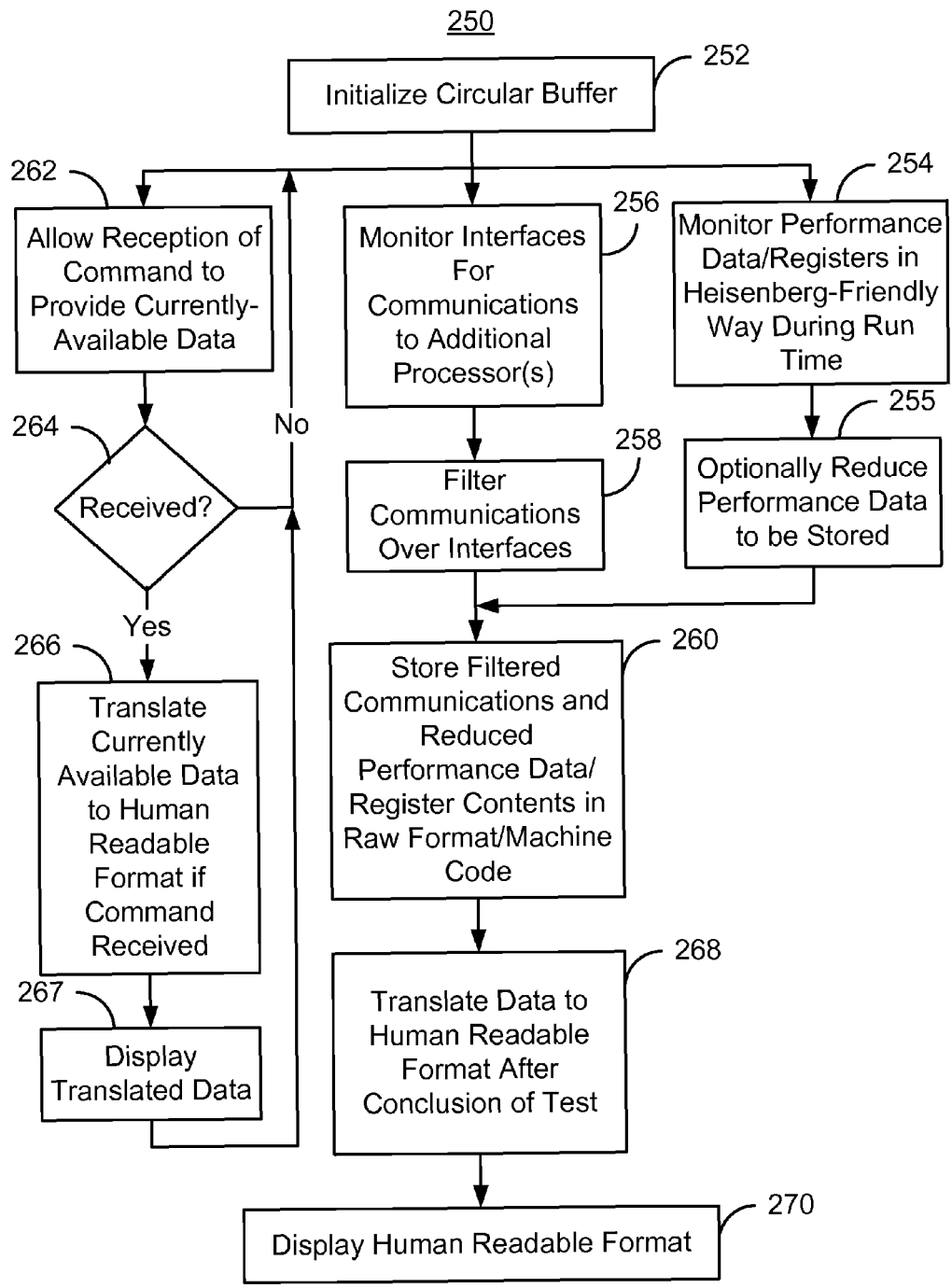
FIG. 7 depicts an exemplary embodiment of a method for performing testing of a video and/or audio playback device.

FIG. 7 depicts an exemplary embodiment of a method 250 for testing the playback device 110'. Thus, the method 250 is described in the context of the system 100' depicted in FIG. 6. In one embodiment, the method 250 commences when the main processor 112' initializes the interfaces 111A, 111B, 111C, and 111D. Thus, when the playback device 110' starts an initialization phase in preparation for playing a video file, the method 250 starts. The circular buffer 150' is thus initialized in response to initialization of the interfaces, via step 252.

The method 250 then may be considered to carry out various tasks substantially in parallel. The registers 113, 124, 128, 132, and 136 and/or other locations that may store relevant performance data are monitored in a Heisenberg-friendly manner, via step 254. In one embodiment, step 254 includes periodically reading the registers 113, 124, 128, 132, and 136 and/or other locations such that relevant data may be obtained without substantially disturbing performance of the playback device 110'. The trace agent 140' may be used to perform step 254. Thus, performance data may be obtained. In addition, the data to be stored may optionally be reduced, via step 255. For example, a logarithmic pushback might be used. In some embodiments, for example, a register may be initially read and have its contents stored every second. After a certain period of time, two readings may be combined (e.g. averaged) to one reading. Thereafter, the register may be read every two seconds. After another period of time, these readings may be combined with previous readings to occupy half of the space in memory. Thereafter, the register may be read every four seconds. Thus, a variety of mechanisms may be used to reduce the amount of stored performance data.

One or more of the interfaces 111A, 111B, 111C, and 111D are monitored during the test, via step 256. In some embodiments, all of the interfaces 111A, 111B, 111C, and 111D are monitored for communications between the main processor 112' and the additional processors 122, 126, 130, and 134. In other embodiments, some subset of the interfaces 111A, 111B, 111C, and 111D are monitored in step 256. In some embodiments, steps 256 and 258 are performed using the trace agent 140'. The setting of properties, commands, return values, and any other communication between the main processor 112' and the additional processors 122, 126, 130, and 134 occurring over the interfaces 111A, 111B, 111C, and 111D may be monitored. Filtering may be performed via step 258. In one embodiment, step 258 is performed in analogous manner to that described in the method 220. Thus, communications may be filtered based on the number of occurrences.

The communications and performance data is stored based on the filtering and optional reduction of performance data, via step 260. In addition to the filtering in step 258, in some embodiments, the performance data obtained in step 254 may be reduced in step 255. In some embodiments, all performance data is reduced based on a logarithmic scale and only a portion stored in step 260. For example, the buffer may be filled, and then compressed by a factor of two. Once the buffer is refilled the data is again compressed by a factor of two. This process repeats to compress data on a logarithmic function of the size of the data stored. However, other mechanisms for reducing the size of the data stored may be used. Note that some data may be stored regardless of filtering or data reduction in step 260. For example, a chart or other data relating to a glitch in audio and/or video in a soak test may be stored to ensure that this information remains available to the user for evaluating quality of the playback. However, other data may be discarded to reduce the total amount of data stored. Thus, the possibility that the buffer 150' is filled may be reduced.

In addition to monitoring and filtering of data in steps 254, 255, 256, and 258, reception of a command to provide currently-available data is allowed, via step 262. It is determined if such a command is received, via step 264. If not, then step 262 is returned to. If such a command is received, then the data currently stored in the circular buffer 150' is translated from raw format to a human-readable format, via step 266. Step 266 is performed by the trace agent 140'. Note that step 266 may not be Heisenberg-friendly because the test is ongoing while the translation is performed in step 266. In some embodiments, the currently available data may be periodically stored for later viewing in a Heisenberg-friendly manner. Such storage may be performed periodically and/or in response to a command being received. For example, performance data may be periodically stored such that it is not overwritten or discarded. This data may be viewed later by the user. The translated currently available data may also be displayed, via step 267.

After conclusion of the test, the raw data stored in the circular buffer 150' is converted to a human-readable format, via step 268. For example, the identities of properties called, their arguments, and the results returned may be translated into text. These translations may be performed using a lookup table that converts the machine code/raw format of properties, arguments, and other communications to text. Further, the order of the communications may be provided by placing the translated communications in order in the human-readable format. In some embodiments, the human readable-format may include a graphical representation of the communications. Because step 268 is performed after conclusion of the test, step 268 is also Heisenberg-friendly.

The human-readable format may then be displayed to the user, for example on the display 118' or on a host (not shown), via step 270. For example, a file listing the text corresponding to the communications may be accessed by the user and printed or shown on a display. The display might be the display 118' corresponding to the playback device or a separate display of another computer. In some embodiments, graphs of the performance and/or other data may be provided. Communications may also be displayed in other formats such as in text, in tables, reports, and using various colors. For example, the number of occurrences of particular properties or other communications versus time may be depicted. As a result, the communications may be provided to the user in a manner that the user can read.

Using the method 250 and the system 100', performance of the playback device 110' may be tested in a Heisenberg-friendly manner. The operation of the trace agent 140' and use of the method 250 may not substantially perturb operation of the playback device 110'. Because testing may be accomplished in a Heisenberg-friendly manner, a manufacturer may be better assured that the test results accurately indicate performance of the playback device 110', rather than the test itself. In addition to being Heisenberg-friendly, the trace agent 140' and the method 250 may allow for improved evaluation of the performance of the playback device 110'. For example, because each communication between the main processor 112' and the additional processors 122, 126, 130, and 134 may be recorded, a more accurate picture of issues in the performance of the playback device 110' may be achieved. The properties, the arguments used in properties, the results returned, and the order that properties are called may be determined in a Heisenberg-friendly manner. It can thus be determined whether software applications desired to run on the playback device 110' call properties in the proper order, provide the correct arguments and function within the specifications of the playback device 110'. Similarly, because performance data for the processors 112', 122, 126, 130, and 134 may be read from registers and recorded, other issues with performance may be diagnosed in a Heisenberg-friendly manner. For example, using this data, it can be determined whether frame(s) are skipped, whether a buffer is starved, and when a system clock rolls over. Issues in performance such as a skipped frame or a stoppage of playback in the video may then be correlated to particular activities such as a starved buffer or clock rollover. Thus, reasons behind a decline in performance may be better diagnosed. Consequently, meaningful testing of the playback device 110' as well as software applications run on the playback device 110' may be better achieved.

A method and system for testing playback devices has been disclosed. The method and system has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

I claim:

1. A computer-implemented method for performing a test of an audio/video playback device including at least one main processor, a plurality of interfaces, and a plurality of additional processors, the at least one main processor communicating with the plurality of additional processors through the plurality of interfaces, the method comprising:
    monitoring at least a portion of the plurality of interfaces for communications between the at least one main processor and the plurality of additional processors, wherein the step of monitoring further includes filtering at least a portion of the plurality of properties, wherein the filtering further includes
        determining whether a property of the portion of the plurality of properties has been recorded a threshold number of times;
        if the property has been recorded the threshold number of times, flagging the property; and
        if the property has been recorded the threshold number of times, at least one of not recording future occurrences and recording a portion of future occurrences;
    storing the communications in a raw format during the test;
    translating the communications from the raw format to human-readable format after conclusion of the test; and
    displaying the human-readable format of the communications, wherein the displaying further includes providing an indicator for at least one of the future occurrences.

2. The method of claim 1 wherein the communications correspond to calls for a plurality of properties and wherein the monitoring further includes:
    starting the monitoring in response to initialization of the at least the portion of the plurality of interfaces; and
    recording at least one of a property identity for each of the plurality of properties, at least one argument of the plurality of properties, results for the each of the plurality of properties, and an order of the plurality of properties.

3. The method of claim 1 wherein the monitoring further includes:
    filtering at least a portion of the plurality of properties.

4. The method of claim 1 wherein the threshold number is a first threshold during a dynamic phase of the test and a second threshold during a steady state phase of the test.

5. The method of claim 1 wherein the filtering is only performed after a steady state phase is attained.

6. The method of claim 1 further comprising:
    reading run time data; and wherein the storing further includes
    recording the run time data in a raw format in the storage.

7. The method of claim 1 wherein the storing further includes:
    storing the communications in a circular buffer.

8. A computer-implemented method for performing a test of an audio/video playback device including at least one main processor, a plurality of interfaces, and a plurality of additional processors, the at least one main processor communicating with the plurality of additional processors through the plurality of interfaces, the method comprising:
    monitoring at least a portion of the plurality of interfaces for communications between the at least one main processor and the plurality of additional processors;
    storing the communications in a raw format during the test, the storing further including recording the run time data in a raw format in the storage;
    translating the communications from the raw format to human-readable format after conclusion of the test;
    displaying the human-readable format of the communications;
    reading run time data; and
    reducing the plurality run time data recorded based on a logarithmic scale.

9. A computer-implemented method for performing a test of an audio/video playback device including at least one main processor, a plurality of interfaces, and a plurality of additional processors, the at least one main processor communicating with the plurality of additional processors through the plurality of interfaces, the method comprising:
    monitoring at least a portion of the plurality of interfaces for communications between the at least one main processor and the plurality of additional processors;
    storing the communications in a raw format during the test, the storing further including recording the run time data in a raw format in the storage, wherein the recording the run time data further includes recording the values of the plurality of registers;
    translating the communications from the raw format to human-readable format after conclusion of the test;
    reading run time data, wherein the reading the run time data further includes:
    reading a plurality of registers during the test such that the reading is Heisenberg-friendly; and
    displaying the human-readable format of the communications.

10. The method of claim 9 wherein the reading further includes:
    reading each of the plurality of registers in an order over a time, the time being determined to be Heisenberg-friendly.

11. The method of claim 9 wherein the plurality of registers indicate at least one of a buffer level, an error in a data stream provided to the playback device, a starvation of a buffer, a skip of data, lateness of data, and a clock rollover to zero.

12. A computer-implemented method for performing a test of an audio/video playback device including at least one main processor, a plurality of interfaces, and a plurality of additional processors, the at least one main processor communicating with the plurality of additional processors through the plurality of interfaces, the method comprising:

monitoring at least a portion of the plurality of interfaces for communications between the at least one main processor and the plurality of additional processors;

storing the communications in a raw format during the test;

translating the communications from the raw format to human-readable format after conclusion of the test; and displaying the human-readable format of the communications;

receiving a command to provide a currently-available portion of the raw format as a currently-available human readable format data before the conclusion of the test;

translating the currently-available portion of the raw format to the currently-available human-readable format data in response to the command; and displaying the currently-available human-readable format data.

13. The method of claim 12 wherein the step of translating the currently-available portion of the raw format is performed chunk-by-chunk.

14. A computer-implemented method for a test of an audio/video playback device including at least one main processor, a plurality of interfaces, and a plurality of additional processors, the at least one main processor communicating with the plurality of additional processors through the plurality of interfaces, the method comprising:

initializing a circular buffer in response to an initialization of at least one of the plurality of interfaces;

monitoring at least a portion of the plurality of interfaces for communications between the at least one main processor and the plurality of additional processors, the monitoring further including determining whether the test is in a dynamic phase or a steady state phase;

determining whether a property of the portion of the plurality of properties has been recorded a first threshold number of times if the test is in the dynamic phase and whether the property has been recorded a second threshold number of times if the test is in the steady state phase, the property excluding a plurality of commands including a stop command, a playback command, a pause command and a trick mode command; and if the property has been recorded at least one of the first threshold number of times in the dynamic phase and the second threshold number of times in the steady state phase, flagging the property;

reading a plurality of registers during the steady state phase of the test such that the reading is Heisenberg-friendly;

storing the communications in a raw format in the circular buffer during the test, the storing further includes if the property has been flagged, not recording an occurrence of the property;

and recording the values of the plurality of registers allowing a command to be received, the command for providing a currently-available human-readable format data before the conclusion of the test;

if the command is received, translating a currently-available portion of the raw format to the currently-available human-readable format data in response to the command such that an output rate for the currently-available human-readable format data does not exceed an input rate for the raw format;

displaying the currently-available human-readable format data if the command is received;

translating the communications from the raw format to human-readable format after conclusion of the test; and displaying the human-readable format of the communications; and wherein the displaying further includes:

if the property is flagged, providing an indicator for at least one of the future occurrences.

15. An executable software product stored on a nontransitory computer-readable medium containing program instructions for performing a test of an audio/video playback device including at least one main processor, a plurality of interfaces, and a plurality of additional processors, the at least one main processor communicating with the plurality of additional processors through the plurality of interfaces, the program instructions for:

monitoring at least a portion of the plurality of interfaces for communications between the at least one main processor and the plurality of additional processors;

reading run time data, the reading further including reading a plurality of registers during the test such that the reading is Heisenberg-friendly;

storing the communications in a raw format during the test;

translating the communications from the raw format to human-readable format after conclusion of the test;

displaying the human-readable format of the communications.

16. The executable software product of claim 15 wherein the instructions for monitoring further includes:

filtering at least a portion of the plurality of properties.

17. The executable software product of claim 15 wherein:

the instructions for storing further include recording the run time data in a raw format in the storage.

18. The executable software product of claim 17 wherein the program further includes instructions for:

recording the values of the plurality of registers.

19. The executable software product of claim 18 wherein the plurality of registers indicate at least one of a buffer level, an error in a data stream provided to the playback device, a skip of data, lateness of data, a clock rollover to zero, and a starvation of a buffer.

20. The executable software product of claim 15 wherein the instructions for storing further include:

storing the communications in a circular buffer.

21. The executable software product of claim 15 the program further including instructions for:

receiving a command to provide a currently-available portion of the raw format as a currently-available human-readable format data before the conclusion of the test;

translating the currently-available portion of the raw format to the currently-available human-readable format data in response to the command, the translating performed such that an output rate for the currently-available human-readable format data does not exceed an input rate for the raw format; and displaying the currently-available human-readable format.

22. A system for performing a test of an audio/video playback device including at least one main processor, a plurality of interfaces, and a plurality of additional processors, the at least one main processor communicating with the plurality of additional processors through the plurality of interfaces, the system comprising:

a storage;

a trace agent for monitoring at least a portion of the plurality of interfaces for communications between the at least one main processor and the plurality of additional processors, storing the communications in the storage in a raw format during the test, and translating the communications from the raw format to human-readable format after conclusion of the test, the trace agent being executed using the at least one main processor; and
a memory for storing the trace agent; and
a display for receiving the human-readable format from the trace agent and displaying the human-readable format
wherein the trace agent further reads a plurality of registers during the test such that the reading is Heisenberg-friendly and records the values of the plurality of registers in the storage.

23. The system of claim 22 wherein the trace agent further filters at least a portion of the plurality of properties from being stored in the storage.

24. The system of claim 22 wherein the storage further includes a circular buffer.

25. A system for performing a test of an audio/video playback device including at least one main processor, a plurality of interfaces, and a plurality of additional processors, the at least one main processor communicating with the plurality of additional processors through the plurality of interfaces, the system comprising:
a storage;
a trace agent for monitoring at least a portion of the plurality of interfaces for communications between the at least one main processor and the plurality of additional processors, storing the communications in the storage in a raw format during the test, and translating the communications from the raw format to human-readable format after conclusion of the test, the trace agent being executed using the at least one main processor; and
a memory for storing the trace agent; and
a display for receiving the human-readable format from the trace agent and displaying the human-readable format;
wherein the trace agent further is configured to receive a command to provide a currently-available portion of the raw format as a currently-available human-readable format data before the conclusion of the test and translate the currently-available portion of the raw format to the currently-available human-readable format data in response to the command; and wherein the display displays the currently-available human-readable format data.

26. The system of claim 25 wherein the trace agent is configured to translate the currently-available portion of the raw format chunk-by-chunk.

* * * * *